Figure 1:
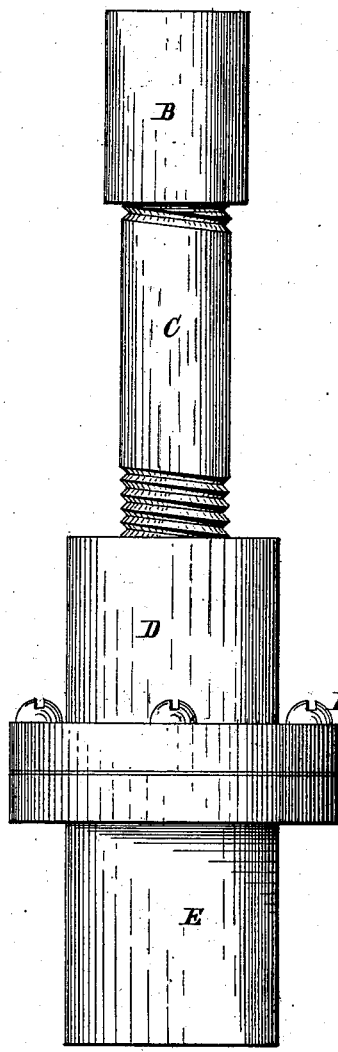

(No Model.)

W. R. PATTERSON.
PACKING PIPE JOINTS.

No. 244,479. Patented July 19, 1881.

Witnesses
W. C. Corliss
Herbert B. Johnson

Inventor
William R. Patterson
By George P. Barton
Attorney

United States Patent Office.

WILLIAM R. PATTERSON, OF CHICAGO, ILLINOIS, ASSIGNOR TO THE WESTERN ELECTRIC MANUFACTURING COMPANY, OF SAME PLACE.

PACKING PIPE-JOINTS.

SPECIFICATION forming part of Letters Patent No. 244,479, dated July 19, 1881.

Application filed April 1, 1881. (No model.)

*To all whom it may concern:*

Be it known that I, WILLIAM R. PATTERSON, of Chicago, Illinois, have discovered certain new and useful Improvements in the Art of Packing Pipe-Joints of Telegraph-Cables, of which the following is a full, clear, concise, and exact description.

Great difficulty has been experienced in making tight the joints of the pipes of oil telegraph-cables. The ordinary mixture of white or red lead and oil which has been used as a packing upon the threads of pipes of this description does not harden in the oil, as in joints exposed to water and gas. The lead is also liable to get inside the pipe and injuriously affect the insulating properties of the oil. As an improvement on this, glue, silicate of soda, and shellac varnish have been used, which are open to objections on account of being dissolved by the water outside or the oil inside the pipe, or on account of not uniting well with the metal. Hence if there is any imperfection in the threads the break or cavity will not be filled by the packing. In order to avoid these objections I coat the threads on the end of the pipe and inside the coupling with tin, zinc, or copper, and then amalgamate the threads with mercury as they are screwed together. I prefer tin to zinc or copper for a screw-joint, because it does not tarnish in the air, so as to require special cleaning just before the amalgamation. It may be laid on in a thinner coat than zinc and equally uniform. Tin and zinc are preferable to copper, as they form an alloy on the surface of the iron, while copper, whether deposited chemically or electrically, may not be firmly united with the iron. The amalgamating process may be advantageously applied to flange-joints and connections which are usually made tight by rubber or similar packing. In this case it may not be necessary to previously coat the iron with another metal, but the surfaces may be cleaned and amalgamated directly by the use of sodium amalgam. This may be applied to a screw-joint as well, except for the difficulty of properly cleaning the threads when the joint is to be made.

In preference to using pure mercury I prefer a thick pasty amalgam in making the joint and amalgamating the metal. Tin, zinc, lead, copper, or other suitable metal may be used, either alone or in combination with others, according to convenience in making the amalgam, or as may be most advantageous for the joint required. An amalgam containing twenty-five or thirty per cent. of copper is to be preferred, in case there are large cavities to be filled up, from its well-known property of hardening without contracting its volume when properly treated. The process results in a continuous metallic connection between the two surfaces to be joined—first, the mass of the iron, then the surface-alloy with the amalgam united in the same manner to the other body of iron. Any mercury which penetrates to the inside of the tube will have no injurious effect upon the insulation, and it is equally unaffected by oil and water.

Figure 2:
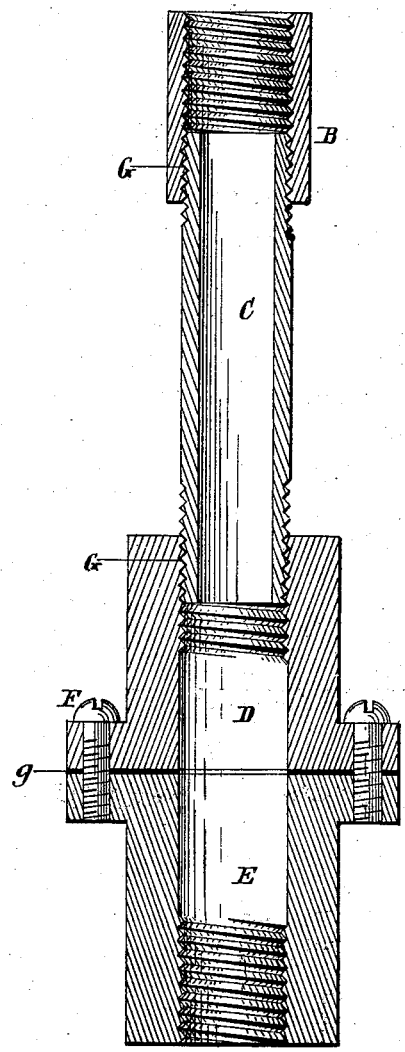

In the drawings, Figure 1 is an elevation, and Fig. 2 a section, of the pipe of an oil-cable.

The sections B and C and D are screwed together, and the sections D and E are united by the studs screwed into the flanges. The threads, as indicated at G, are tinned and amalgamated together by mercury. The amalgam of the flange-joint is indicated by $g$.

I am aware that the process of tinning or galvanizing the threads of pipes has been used to protect them from corrosion, and that in some joints a cavity has been made at the end of the coupling, to be filled with solder or mercury, and that there is nothing new about the amalgams I propose to use; but I am not aware that mercury or amalgams have been used to cover the surfaces of the threads and fill up any breaks or imperfections existing there, or that they have been applied to flanges or flanged joints as a packing material. Softer metals have been used as packing, but not so as to make a continuous metallic union without the aid of heat.

As to the state of the art prior to my invention reference is made to Letters Patent No. 220,407 to Mixer and De La Vergne, October 7, 1879, "clamps and couplings."

My process may be used for other styles of telegraphic cables and for gas, water, and other pipes where the heat will not be sufficient to decompose the amalgam.

I claim—

1. The art of uniting pipe-joints with an unbroken metallic connection without the aid of heat by first preparing the opposing surfaces by means of a coating of tin or its equivalent, and then applying mercury or mercury-amalgam to the threads thus coated, and then bringing the surfaces into close proximity, so as to unite or amalgamate with the mercury or amalgam, substantially as and for the purpose specified.

2. The art of packing pipe-joints with an unbroken metallic connection without the aid of heat, consisting of tinning the threads of the parts to be united, and then applying mercury to the threads thus coated, and afterward screwing the parts together, whereby the two pieces are amalgamated and all imperfections or breaks in the threads filled, substantially as shown and described.

3. The art of uniting pipe-joints with an unbroken metallic connection without the aid of heat, which consists in first preparing the opposing surfaces by means of a coating of tin or its equivalent, and then applying mercury or mercury-amalgam to the surfaces thus coated, and then bringing the surfaces into close proximity, so as to unite or amalgamate with the mercury or amalgam, substantially as and for the purpose specified.

WILLIAM R. PATTERSON.

Witnesses:
WILLIAM S. GRANGER,
GEORGE P. BARTON.